United States Patent Office 3,166,869
Patented Jan. 26, 1965

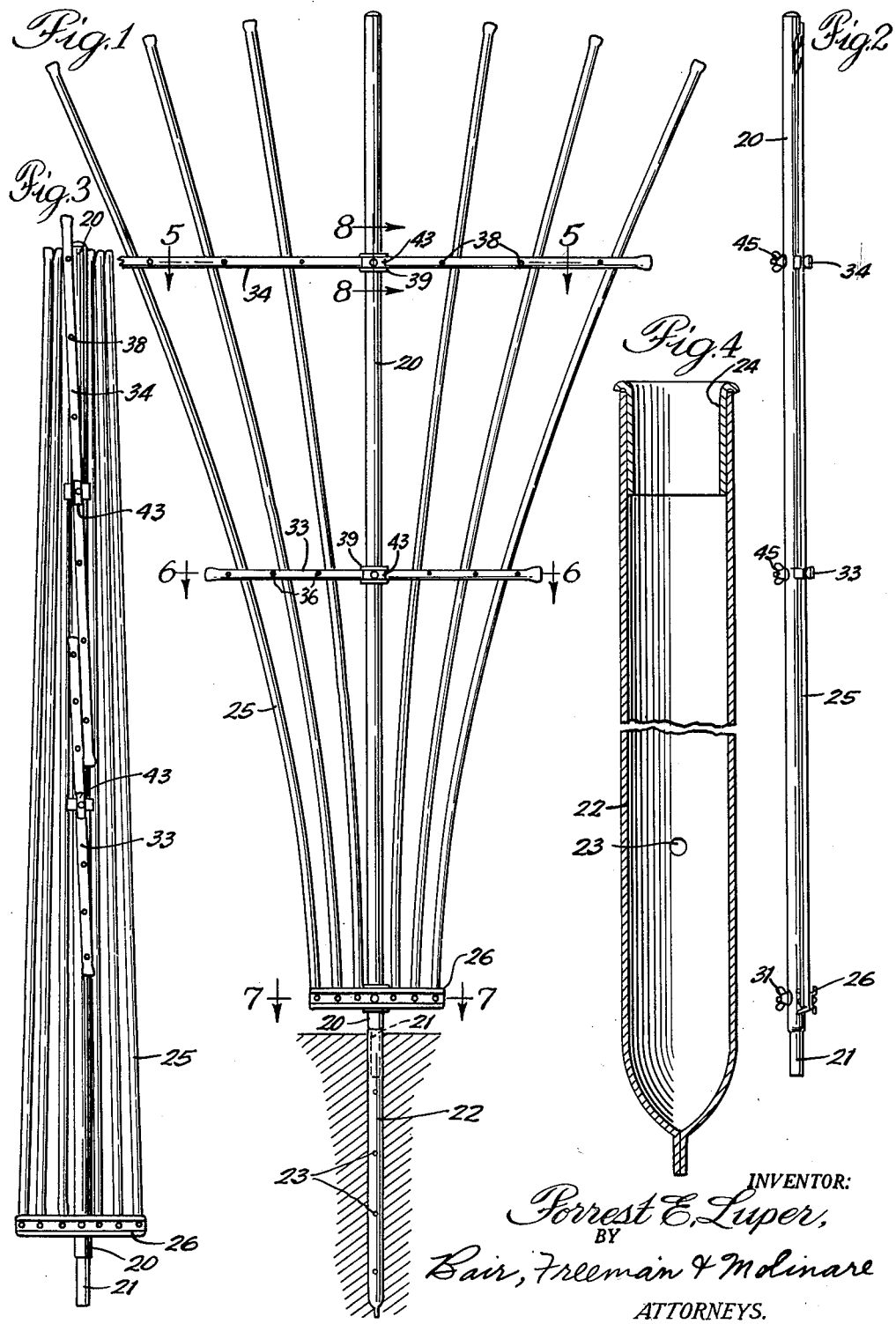

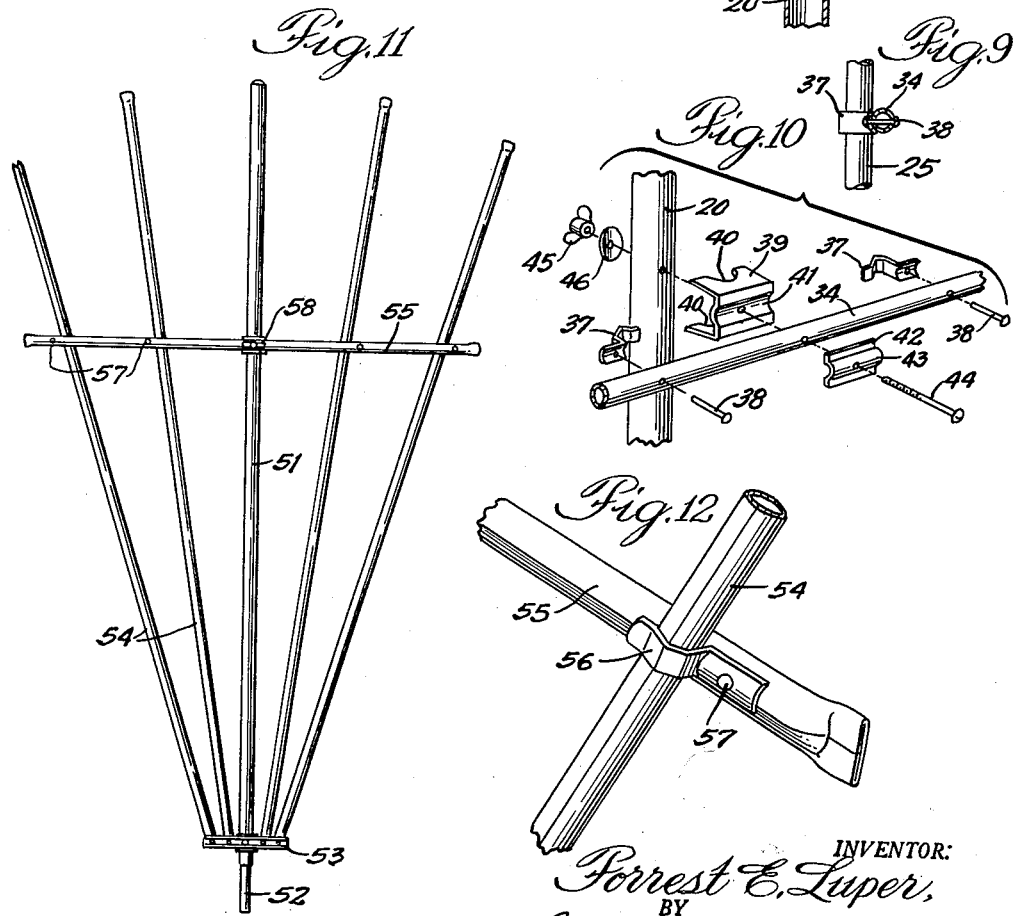

3,166,869
TRELLIS
Forrest E. Luper, Avon, Ill., assignor to Forrest E. Luper and John R. Sundberg, doing business as Luper & Sundberg, a partnership of Avon, Ill.
Filed July 25, 1960, Ser. No. 44,908
5 Claims. (Cl. 47—47)

This invention relates to a trellis and particularly to a trellis for use in training the growth of flowers or plants of various types.

It is an object of the invention to provide a trellis which may be readily collapsed or set up, and when set up is of very strong and rigid construction.

It is another object of the invention to provide a trellis formed mainly from tubular metal parts.

It is a further object of the invention to provide a trellis which is inexpensive to manufacture and which may be shipped or stored in its collapsed or folded position, thus saving considerable space.

With these and other objects in view, my invention consists in the construction, arrangement and combination of the various parts of my device whereby the objects contemplated are attained, as hereinafter more fully set forth, pointed out in my claims and illustrated in the accompanying drawing, wherein FIGURE 1 is a vertical view of the trellis in its normal position embedded in the ground;

FIGURE 2 is a side view of the trellis shown in FIGURE 1;

FIGURE 3 is a vertical view of the trellis shown in FIGURE 1 in its folded or collapsed condition;

FIGURE 4 is a sectional view of the ground piercing member of the trellis with the protective metallic cap in position;

FIGURE 5 is a sectional view of the trellis taken on line 5—5 of FIGURE 1;

FIGURE 6 is a sectional view of the trellis taken on line 6—6 of FIGURE 1;

FIGURE 7 is a sectional view of the trellis taken on line 7—7 of FIGURE 1;

FIGURE 8 is a sectional view of the trellis taken on line 8—8 of FIGURE 1;

FIGURE 9 is a partial sectional view of the trellis showing one of the clips for retaining the vertical rods of the trellis in position;

FIGURE 10 is an exploded perspective view of a portion of the trellis showing how various parts are assembled;

FIGURE 11 is a vertical view of a second embodiment of the invention; and

FIGURE 12 is a partial perspective view of the trellis shown in FIGURE 11.

Referring specifically to the drawings for a detailed description of the invention, numeral 20 designates a vertical member or standard, preferably formed of tubular metal, constituting the major vertical structural member of the trellis. Numeral 21 designates a shank which is secured to the rod 20 in vertical alignment therewith and which is adapted to be inserted in a ground piercing member 22 to retain the trellis in upright position. The ground piercing member 22 is hollow and is provided with apertures 23 below the portion which enters the ground so that water and fertilizer may be poured into the hollow member 22 and enter the soil surrounding the trellis. A protective cap 24 is preferably provided for the ground piercing member 22 so that when the member 22 is forced into the soil usually by hammering, the member 22 will not be deformed. The protective member 24 is removed from the ground piercing member 22 after the member 22 has been inserted into the soil to the desired depth and the shank 21 of the trellis is then inserted in the hollow member 22.

A plurality of flexible tubular members 25, also preferably made from hollow metal, form the remaining uprights of the trellis and are secured to a horizontal retaining member 26 by rivets 27. The main structural member 20 is also secured to the horizontal retaining member 26 by a bracket 28 which bracket 28 and member 20 are secured to the retaining member 26 by a bolt 29, a thumb screw 31, and a washer 32 between the thumb screw and the member 20.

Additional horizontal retaining members 33 and 34 are provided spaced above the retaining member 26 and spaced from each other as shown in FIGURE 1. Also as shown in FIGURE 1, the horizontal member 33 is shorter than the retaining member 34 so that when the trellis is in its assembled condition the vertical rods 25 will be spread into curved forms of various radii to provide the usual appearance of a trellis of this type.

A plurality of clips 35, as best shown in FIGURES 6 and 10, are secured to the horizontal member 33 by rivets 36. It will be noted that, as shown in FIGURE 6, the clips 35 which are preferably formed of spring metal, face toward the center of the trellis on both sides of the main vertical member 20, and the rods 25 are retained by the clips 35. The reserve direction of the clips 35 together with similar clips 37 on the horizontal member 34 provide for considerable rigidity of the entire structure.

The clips 37 are secured to the horizontal member 34 by rivets 38 and a comparison of FIGURES 5 and 6 show that the clips 37 face in opposite directions to the clips 35, thus providing for additional rigidity of the entire structure. The clips 37 are also preferably formed of spring metal and the vertical rods 25 are retained in position by the clips 37.

The horizontal members 33 and 34 are also provided centrally thereof with brackets 39 for receiving the vertical member 20. The brackets 39 are provided with an arcuate portion 41 as best shown in FIGURE 10 to receive the horizontal members 33 and 34 and with arcuate openings 40 to receive the vertical member 20. A second bracket or retaining member 42 provided with an arcuate portion 43 engages the outer surface of the horizontal members 33 and 34 and the entire assembly is retained in position by bolts 44 which extend through the brackets 39 and 42 and through the horizontal members 33 and 34 and the vertical member 20. A wing nut 45 and a washer 46 are provided for retaining the assembly in position, the wing nut being screwed on to the bolt 44. These elements and the assembly thereof are best shown in FIGURE 10. In addition, the clips 37 and the rivets 38 for retaining the clips in position are shown in FIGURE 10.

When it is desired to store or ship the trellis it is only necessary to loosen the wing nuts 31 and 45 with their associated bolts and brackets and snap the vertical rods 25 from beneath the clips 35 and 37. The flexible vertical rods 25 will then spring to the position shown in FIGURE 3. Furthermore, the retaining members 33 and 34 may then be rotated so that they are in a vertical position rather than horizontal, so that the entire structure will appear as shown in FIGURE 3 and may be readily shipped or stored. Also the shank 21 is removed from the ground piercing member 22, and the ground piercing member may remain in the ground or may be stored with the trellis.

When the trellis is to be again erected the reverse procedure is followed and the members 33 and 34 are again rotated to their horizontal positions, locked in place by tightening the wing nuts, and the rods 25 are again positioned beneath the clips 35 and 37. It is seen that the clips comprise stop means for limiting the movement of the flexible vertical rods with respect to the main vertical member or standard 20.

Referring to FIGURES 11 and 12 for a detailed description of the second embodiment of the invention, it will be noted that this construction is of a more simple design than the trellis shown in FIGURES 1 to 10, inclusive, but this trellis does not have the strength and rigidity of the trellis shown in FIGURES 1 to 10, inclusive. The trellis shown in FIGURES 11 and 12 is provided with a main vertical structural member 51 preferably made of tubular metal and is provided with a shank 52 and a retaining member 53 quite similar to the shank 21 and retaining member 26 of the first embodiment. Likewise, it is provided with flexible vertical members 54 preferably formed of tubular metal, the members 54 being similar to the members 25 in the first embodiment.

In this embodiment of the invention only one horizontal member 55 is provided positioned about half way between the top and the bottom of the main structural member 51, so that the flexible members 54 may be spread to form the conventional trellis appearance as shown in FIGURE 11. The horizontal member 55 has clips 56 secured thereto by rivets 57 and the clips 56 retain the flexible trellis members 54 in position. An assembly 58 similar to that shown in FIGURE 8 is provided for retaining the normally horizontal member 55 in position. When it is desired to store or ship this trellis the assembly 58 is loosened, as in the first embodiment of the invention, the upright trellis members 51 are snapped out of the clips 56, whereupon they will naturally all assume a vertical position, and the horizontal member 55 may also be rotated to a horizontal position in a manner similar to the horizontal members 33 and 34 of the first embodiment. Again when the trellis is to be placed in its usual position the procedure is reversed.

From the foregoing, it will be apparent that I have provided a trellis which is readily collapsed or folded for shipping or storage and readily again placed in the usual trellis position. This has been accomplished without sacrificing the rigidity of a non-collapsible structure. In addition I have provided a unique support for the trellises which also provides for the introduction of water or fertilizer in the soil adjacent the trellis.

Some changes may be made in the construction and arrangement of the parts of my device without departing from the real spirit and purpose of my invention, and it is my intention to cover by my claims any modified forms of structure or use of mechanical equivalents which may be reasonably included within their scope.

What is claimed is:

1. A trellis construction comprising a first horizontal supporting member adjacent the bottom of the trellis, a central vertical member secured to said horizontal supporting member and extending upwardly therefrom, a plurality of flexible vertically extending members also secured in spaced relation to said horizontal supporting member, a second horizontal member spaced above said first horizontal member, means rotatably connecting the second horizontal member to the central vertical member, means associated with the second horizontal member for readily securing or detaching said flexible members with respect thereto, a third horizontal member spaced above said second horizontal member, means rotatably connecting the third horizontal member to the central vertical member, and means associated with said third horizontal member for readily securing or detaching said flexible members with respect thereto, the securing means associated with the second and third horizontal members comprising spring clips, each spring clip cooperating with an associated horizontal member to define an opening, said clips having their openings facing in opposite directions on opposite sides of said central vertical member and facing in opposite directions on said second and third horizontal members.

2. A trellis construction comprising a first horizontal supporting member adjacent the bottom of the trellis, a central vertical member secured to said horizontal supporting member and extending upwardly therefrom, a plurality of flexible vertically extending members also secured in spaced relation to said horizontal supporting member, a second horizontal member spaced above said first horizontal member, means rotatably connecting the second horizontal member to the central vertical member, means associated with the second horizontal member for readily securing or detaching said flexible members with respect thereto, a third horizontal member spaced above said second horizontal member, means rotatably connecting the third horizontal member to the central vertical member, and means associated with said third horizontal member for readily securing or detaching said flexible members with respect thereto, the securing means associated with the second and third horizontal members comprising spring clips, each spring clip cooperating with an associated horizontal member to define an opening, said clips having their openings facing in opposite directions on opposite sides of said central vertical member and facing in opposite directions on said second and third horizontal members, said second horizontal member being longer than said first horizontal member and said third horizontal member being longer than the second.

3. A collapsible substantially planar trellis construction comprising an elongated central support member, a first supporting member connected adjacent the bottom of said central support member, a plurality of flexible elongated members, each connected at one end to said first supporting member and the free end thereof extending upwardly, a second supporting member rotatably connected to said central support member and adapted to extend transversely to said central support member, fastening means for maintaining the second supporting member in transverse relationship to the central support member, and resilient retaining means on said second supporting member for detachably engaging said elongated flexible members, whereby said trellis construction may be stored in a collapsed condition and can be readily prepared for use by rotating and maintaining the second supporting member in transverse relation with the central support member, and by detachably engaging the free ends of the flexible elongated members with the resilient retaining means.

4. A collapsible substantially planar trellis construction comprising an elongated central support member, a first supporting member connected adjacent the bottom of said central support member, a plurality of flexible elongated members, each connected at one end to said first supporting member and the free end thereof extending upwardly, a second supporting member rotatably connected to said central support member and adapted to extend transversely to said central support member, means for retaining the second supporting member in transverse relationship to the central support member, and resilient retaining means on said second supporting member for detachably engaging said elongated flexible members, said resilient retaining means comprising a plurality of spring clips, each having a part connected to the second supporting member and a free end spaced therefrom, each free end cooperating with said second supporting member to define an opening within which a flexible elongated member may be detachably retained, whereby said trellis construction may be stored in a collapsed condition and may be readily used by rotating and maintaining the second supporting member in transverse relationship with the central support member, and by detachably engaging the free ends of the flexible elongated members within the resilient retaining means.

5. A collapsible trellis construction comprising a standard, first, second and third support members mounted in spaced apart positions on said standard, said second and third support members being rotatably supported on said standard, a plurality of longitudinal members each pivotally mounted in a respective position on said first support member, whereby each longitudinal member may rotate either away from or towards said standard, resilient stop means carried by said second support member for engaging said longitudinal members and for preventing the movement of a respective longitudinal member in one direction beyond a respective position, and support stop means carried by said third support member for engaging said longitudinal members and for preventing rotation of a respective longitudinal member in another direction beyond a respective position, whereby said longitudinal members are prevented from rotating through more than a respective arc relative to said standard.

References Cited in the file of this patent

UNITED STATES PATENTS

| | | | |
|---|---|---|---|
| 166,766 | Goodspeed | Aug. 17, | 1875 |
| 565,540 | Horan | Aug. 11, | 1896 |
| 601,438 | Ericksson | Mar. 29, | 1898 |
| 839,423 | Richards | Dec. 25, | 1906 |
| 890,948 | Waite | June 16, | 1908 |
| 1,031,941 | Lanham | July 9, | 1912 |
| 1,311,136 | Parr | July 22, | 1919 |
| 1,653,263 | Farrington | Dec. 20, | 1927 |
| 1,903,122 | Merz | Mar. 28, | 1933 |
| 1,984,265 | Hamer | Dec. 11, | 1934 |
| 2,774,186 | Wilkins | Dec. 18, | 1956 |

FOREIGN PATENTS

| | | | |
|---|---|---|---|
| 188,957 | Austria | Mar. 25, | 1957 |
| 746,081 | Great Britain | Mar. 7, | 1956 |
| 339,422 | Switzerland | Aug. 15, | 1959 |